Dec. 8, 1931.  C. E. SCHNELL ET AL  1,835,343
POWER DRIVEN AUTOMATIC SWITCH RECLOSING MECHANISM
Filed Jan. 16, 1928  4 Sheets-Sheet 1
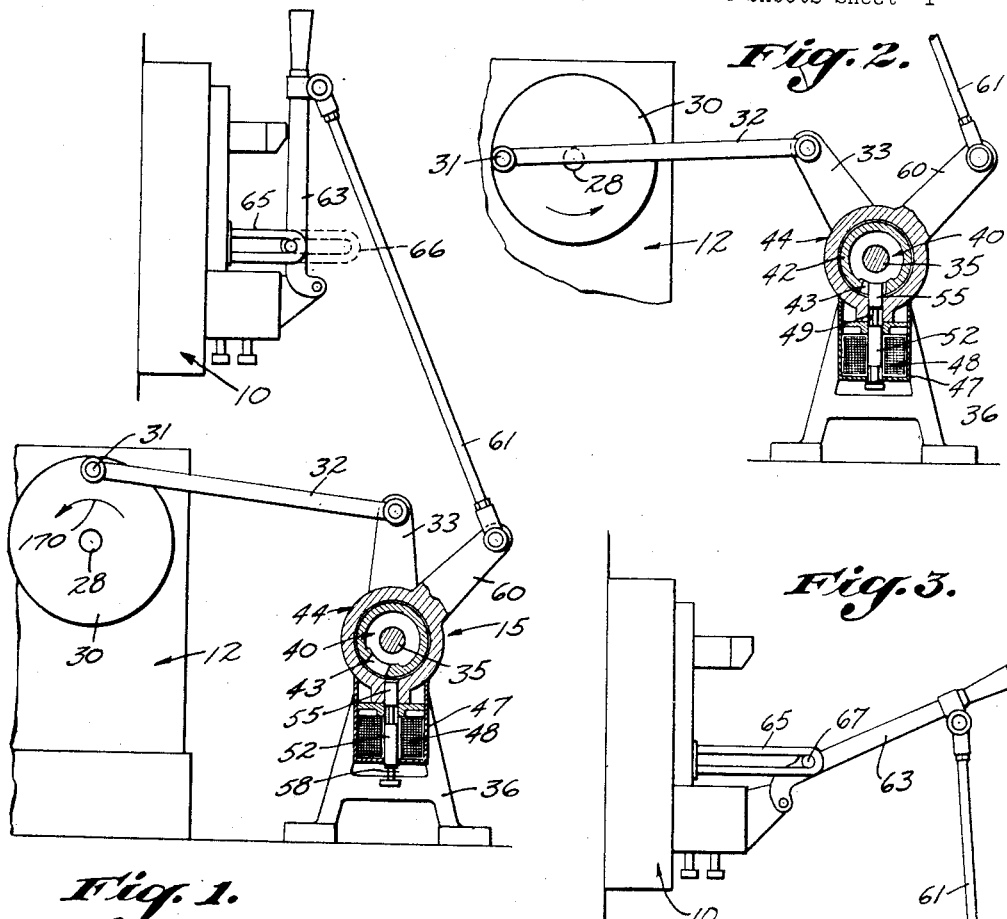
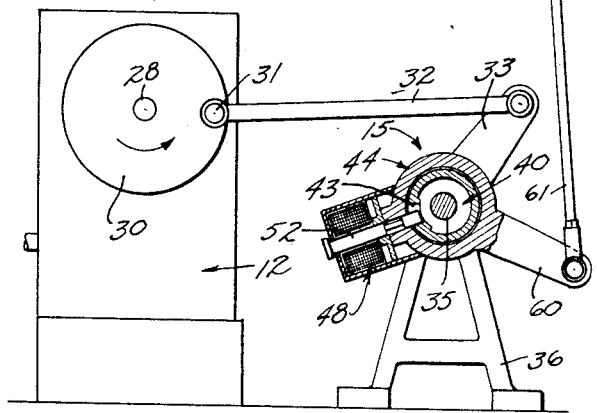
INVENTORS:
Charles E. Schnell,
Ernest K. Sadler,
BY
ATTORNEY.

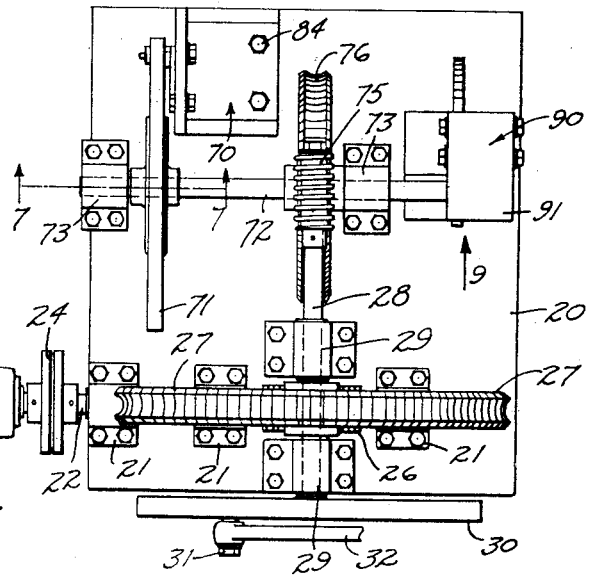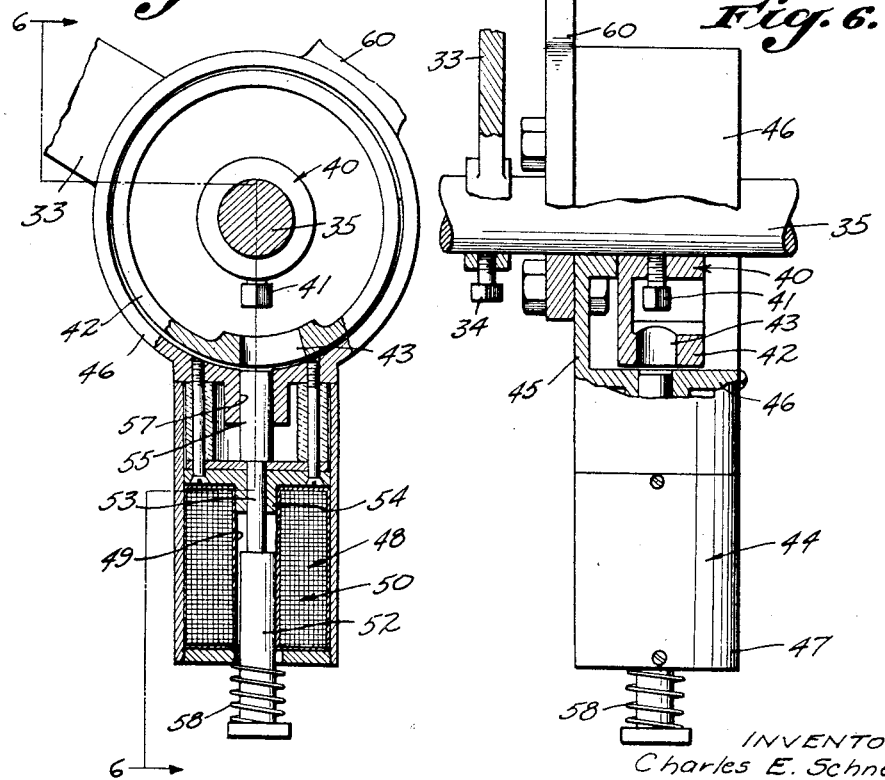

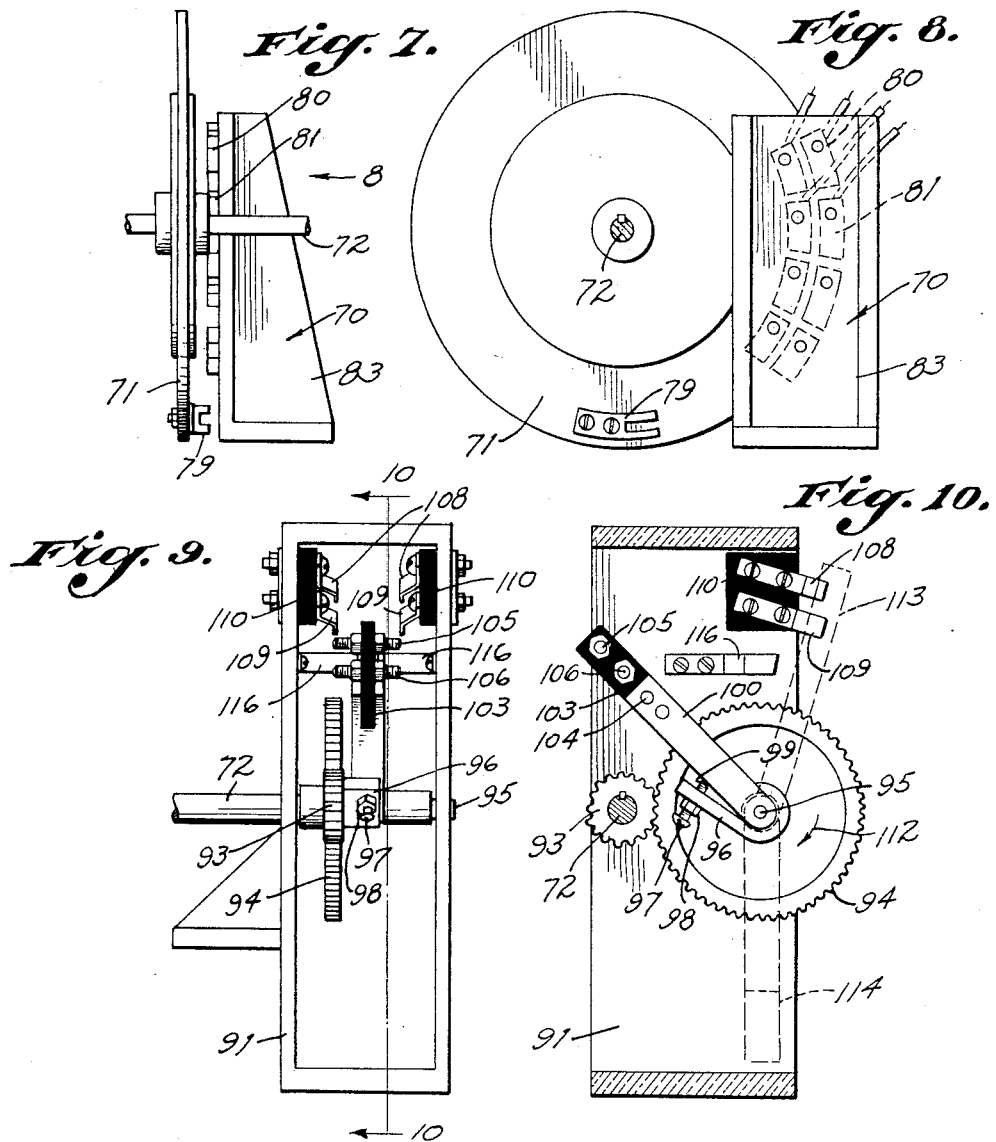

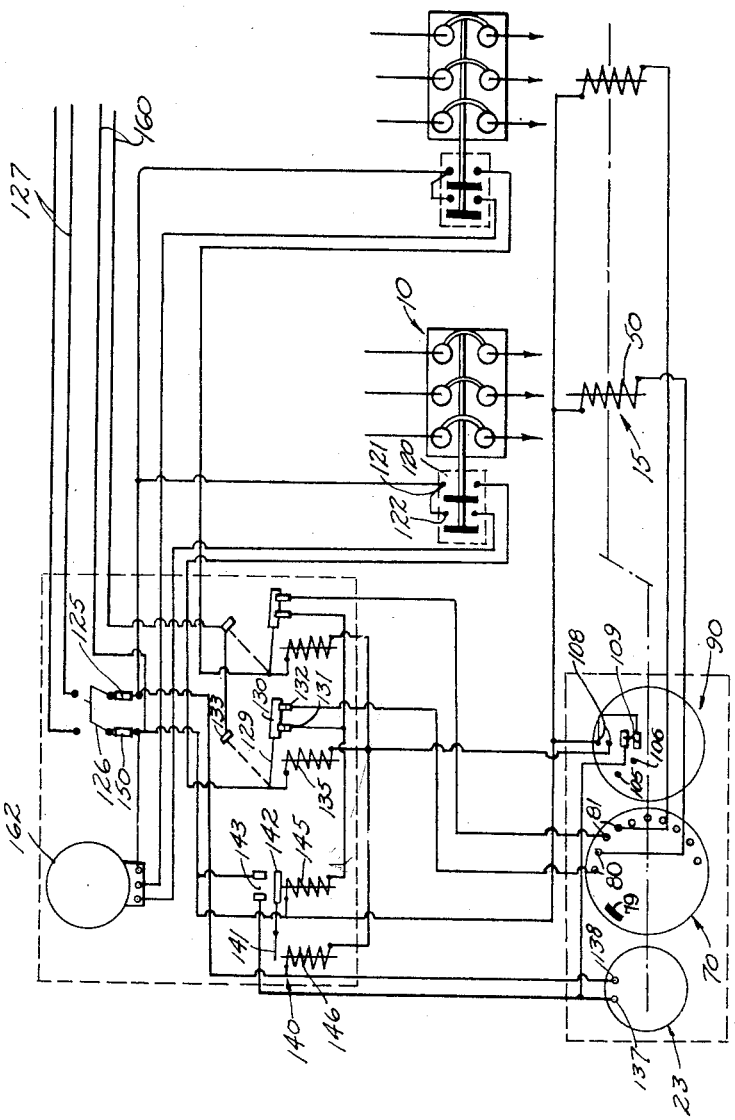

Patented Dec. 8, 1931

1,835,343

UNITED STATES PATENT OFFICE

CHARLES E. SCHNELL, OF FRESNO, AND ERNEST K. SADLER, OF LOS ANGELES, CALIFORNIA

POWER DRIVEN AUTOMATIC SWITCH RECLOSING MECHANISM

Continuation of application Serial No. 714,392, filed May 19, 1924. This application filed January 16, 1928. Serial No. 247,034.

This application is a continuation of our application entitled Power driven automatic switch reclosing mechanism, filed May 19, 1924, Serial No. 714,392.

Our invention relates to a circuit-breaker reclosing mechanism, and more particularly to a mechanism which automatically controls the reclosing of one or a series of circuit breakers when one or more of these breakers have been tripped to open their respective circuits.

In sub-station operation, it is customary to divide the electrical energy supplied thereto by a central station to a number of outgoing lines or feeders. In each of these lines a circuit breaker is installed, this circuit breaker being adapted to open the circuit through its particular line when the current in the line exceeds a predetermined value, or when some other predetermined adverse condition occurs on the line. When the circuit is thus tripped out, it is necessary for a station attendant to manually close the breaker after a short period of time has elapsed. If the adverse condition on the line has been removed, the breaker will remain closed when the line is energized. If, on the other hand, the condition has not been removed, the breaker will immediately open. The operator must then repeat the process until the breaker stays closed or until it is practically certain that the condition on the line will not be remedied without dispatching a repair crew to trace the source of the adverse condition.

It is especially advantageous in sub-station operation to effect the closing of a circuit as soon after the breaker opens as possible, inasmuch as great inconvenience to customers is occasioned by any unnecessary delay. There is necessarily a large time factor in closing the circuit breakers manually, especially where the number of breakers controlled by one operator is large. We have found it possible to reclose a series of circuit breakers individually or collectively when they trip out by means of a central mechanism, this mechanism being automatically operated by the tripping of any one of the breakers.

It is an object of our invention to provide an automatic circuit-breaker reclosing mechanism adapted to automatically close one or a number of breakers connected therewith when any one of the breakers is tripped.

It is a further object of our invention to provide a circuit-breaker reclosing mechanism operated by an actuating means connected to a plurality of breakers, this means coming into operation with the opening of any breaker, and reclosing this particular breaker, or any number of breakers which are opened at this time.

It is a further object of our invention to provide a circuit-breaker reclosing mechanism which automatically comes into operation with the opening of any one of a plurality of circuit breakers, and shuts down after operating for a predetermined length of time.

It is highly advantageous that any circuit-breaker reclosing mechanism be readily adapted to installation in already existing stations.

It is an object of our invention to provide a circuit-breaker reclosing mechanism which may be easily and quickly incorporated with equipment already installed.

A further object of our invention is to provide a reclosing mechanism which will require a minimum of attention and which is very efficient in operation.

Further objects and advantages of our invention will be made evident hereinafter.

In the accompanying drawings we illustrate one type of installation of our reclosing mechanism, but it should be understood that its utility is in no way limited to the particular type of equipment shown, nor is the invention limited to use with the identical apparatus shown as comprising our invention.

Referring to these drawings,—

Fig. 1 is a utility view showing the apparatus of our invention.

Figs. 2 and 3 are views illustrating different positions of the apparatus of our invention.

Fig. 4 is a top view of the actuating mechanism of our invention.

Fig. 5 is a vertical sectional view of a clutch of our invention.

Fig. 6 is a view taken along the line 6—6 of Fig. 5.

Fig. 7 is a view of the selector switch of our invention taken along the line 7—7 of Fig. 4.

Fig. 8 is a side view of Fig. 7 taken in the direction of the arrow, 8.

Fig. 9 is an end view of the limit switch of our invention, this view being taken in the direction of the arrow 9 of Fig. 4.

Fig. 10 is a sectional view taken on the line 10—10 of Fig. 9.

Fig. 11 is a wiring diagram of the apparatus of our invention.

Fig. 1 clearly illustrates the utility of our device. Here, the numeral 10 represents one of a number of circuit breakers, each of these breakers controlling the energization of an outgoing line. Upon the occurrence of a predetermined adverse condition along the line, the circuit breaker 10 on that line is adapted to trip out. This tripping of any one breaker starts the operation of an actuating means 12, this operation then continuing for a predetermined length of time. Each circuit breaker and the actuating mechanism are connected together by a suitable clutch mechanism indicated by the numeral 15, this clutch mechanism being adapted to transmit the motion of the actuating means 12 to the particular circuit breaker which has tripped out. This engagement between the actuating means 12 and the particular circuit breaker 10 is accomplished by suitably engaging the clutch mechanism 15 associated with this breaker. The engagement of any clutch mechanism occurs as a function of the condition of its particular circuit breaker, and takes place only when the circuit breaker is tripped. Any number of circuit breakers 10 may be operated from the actuating mechanism 12, it being only necessary to supply one of the clutch mechanisms 15 for each breaker to be reclosed.

With these fundamental operations in mind the description of the particular apparatus of our invention will be doubly clear.

Referring particularly to Figs. 1 and 4, the actuating means 12 of our invention comprises a bed plate 20 secured to a suitable foundation. Journalled in horizontally aligned bearings 21 secured to the bed plate 20 is a worm shaft 22 which is driven by a drive means which may be in the form of a motor 23 connected therewith through a suitable coupling 24. This motor is adapted to be set into operation by the tripping of any one of the circuit breakers 10 in a manner to be described. Mounted on the worm shaft 22 is a worm 26 which meshes with a worm gear 27 secured to a shaft 28 suitably journalled in bearings 29. Rigidly secured to the shaft 28 at one end thereof is a crank disc 30. This crank disc carries a pin 31 which is pivoted to one end of a connecting rod 32. The other end of the connecting rod 32 is pivoted to the outer end of a rocking lever 33, this rocking lever, as best shown in Fig. 6, being secured by a set screw 34 to an oscillating shaft 35 which is suitably journalled in bearings supported by standards 36 throughout its length. When the actuating means is set into motion, the rocking lever 33 is rocked by means of the connecting rod 32 and the crank disc 30, this motion being, in turn, imparted to the oscillating shaft 35. The oscillating shaft 35 may be of any desired length, but should be long enough to extend adjacent to each of the circuit breakers 10 if a direct connection to the breaker is to be used.

Secured on the shaft 35 adjacent each circuit breaker 10 is a primary clutch member 40, this member being rigidly secured to the shaft 35 by a suitable locking device shown in the drawings as comprising a set screw 41. Each primary clutch member 40 has an annular rim 42, there being an elongated aperture 43 formed radially through this annular rim. Suitably journalled on the shaft 35 adjacent each primary clutch member 40 is a secondary clutch member 44, this member having a plate 45. Extending from the plate 45 is an annular rim 46 of the secondary clutch member 44, this annular rim surrounding the annular rim 42 of the primary clutch member 40 in close juxtaposition thereto. Extending downward from the annular rim 46 is a cylindrical member 47 of the secondary clutch member 44. In this cylindrical member is mounted a solenoid 48. An opening 49 extends longitudinally through the solenoid 48 along the axis of the cylindrical member 47, and surrounding the opening 49 is a suitable solenoid winding 50. The solenoid 48 has a movable core 52 which is adapted to be drawn into the opening 49 when the winding 50 is energized. Secured to the upper end of the core 52 is a non-magnetic rod 53 which is suitably journalled in a hub 54 rigidly secured in the secondary clutch member 44. A hardened pin 55 is connected to the upper end of the non-magnetic rod 53, this hardened pin being slidable in an opening 57 of the annular rim 46.

The opening 57 of the secondary clutch member and the elongated aperture 43 of the primary clutch member 40 are in alignment, as best shown in Fig. 6, so that when the solenoid 48 is suitably energized, the pin 55 bears against the outer periphery of the annular rim 42. If the angular relation between the primary clutch member 40 and the secondary clutch member 44 is correct, this hardened pin will enter the elongated aperture 43 and at this time the secondary clutch member 44 will be caused to move with the primary clutch member 40. A spring 58 aids the quick withdrawal of the hardened pin 55 from the elongated aperture 43 when the solenoid 48 is disengaged and when there is no large frictional force between the pin and the ends of the elongated aperture 43.

Suitably bolted to the plate 45 of the secondary clutch member 44 is a reclosing arm 60. A reclosing link 61 is pivoted to the outer end of the reclosing arm 60, as best shown in Figs. 1 to 3 inclusive. The upper end of the reclosing link 61 is pivoted to an arm or handle 63 of one circuit breaker 10. This handle 63 is of the conventional type and is ordinarily adapted to be manually operated to close the circuit breaker 10. The type of circuit breaker 10 illustrated in Figs. 1 to 3 comprises a plunger 65, this plunger being directly or indirectly connected to the contacts of the circuit breaker. When the plunger is in its full line position indicated in Fig. 1, the circuit breaker is closed. When the breaker trips, the plunger 65 assumes its dotted line position 66 shown in Fig. 1. In reclosing the breaker, it is necessary to first move the handle 63 from its position shown in Fig. 1 into its position as shown in Fig. 3. At this time the plunger 65 engages a pin 67 on the handle, and as the handle 63 is again moved into its position shown in Fig. 1, the pin 67 pushes the plunger 65 inward, thus closing the breaker. Should the adverse condition still remain on the line, the plunger 65 will immediately assume its dotted line position 66 at which time the circuit through the breaker is again open. By putting into operation the actuating means 12, and energizing the solenoid 48 of the breaker which has tripped out, the primary and secondary clutch members are connected together and the movement of the rocking arm 33 is transmitted to the reclosing arm 60 which, in turn, moves the handle 63 through the series of operations previously described.

The solenoid winding 50 is adapted to be energized when the circuit breaker 10 associated therewith has been tripped, and when the selector switch 70 of my invention is in a predetermined position. This selector switch 70 is best illustrated in Figs. 4, 7, and 8, and comprises a rotatable disc 71 secured to an auxiliary shaft 72, this auxiliary shaft being journalled in bearings 73 of the bed plate 20. The auxiliary shaft 72 and the associated disc 71 are adapted to be rotated by means of a worm 75 secured to the shaft 28, this worm meshing with a worm gear 76 which is secured to the shaft 72. A bifurcated selector contact 79 is secured to one face of the rotatable disc 71, this contact being adapted to successively bridge pairs of stationary contacts 80 and 81 as the disc 71 is rotated. These pairs of stationary contacts 80 and 81 are mounted on an insulated support 83 of the selector switch 70, this insulated support being suitably secured to the bed plate 20 by bolts 84. There is a pair of stationary contacts for each solenoid 48 connected to the mechanism of our invention, and these pairs of stationary contacts are adapted to be successively bridged by the selector contact 79 as the disc 71 rotates. However, the solenoid 48 of the clutch mechanism connected to the pair of contacts 80 will be energized only during the time that the circuit breaker 10 associated therewith is open and at the instant that the selector contact 79 bridges the pair of contacts 80, as will be made apparent hereinafter. As soon as the selector contact 79 leaves a pair of contacts 80, the circuit through the solenoid is broken. The mechanism is so timed that the bifurcated contact 79 remains bridged across one pair of contacts such as 80 for one complete revolution of the crank disc 30, this contact being made and broken when the clutch mechanism 15 is in the position shown in Fig. 1.

As previously mentioned, the motor 23 is adapted to be set into operation by the tripping of any one circuit breaker 10, this operation continuing for a predetermined length of time. We accomplish this result by means of a limit switch indicated by the numeral 90 and best illustrated in Figs. 4, 9, and 10. This limit switch 90 is mounted in a casing 91. The auxiliary shaft 72 extends through one wall of the casing 91 and has attached thereto a pinion 93, this pinion meshing with a gear 94 which is secured to a shaft 95, this shaft being suitably journalled in the casing 91. Extending from the gear 94 is an ear 96 in which is mounted an adjusting screw 97 provided with a lock nut 98. The adjusting screw 97 is adapted to engage a front edge 99 of an arm 100, this arm 100 being suitably pivoted so as to freely rotate on the shaft 95. The outer end of the arm 100 is bifurcated to receive a block of insulating material 103, this insulating material being suitably secured thereto by rivets 104. In this insulated block 103, two studs 105 and 106 are mounted, these studs being at different radial distances from the shaft 95. The studs 105 and 106 are adapted to respectively bridge a pair of main limit-contacts 108 and auxiliary limit-contacts 109. One of each pair of contacts 108 and 109 is mounted in an insulated member 110 suitably secured to each inner face of the casing 91 in a position shown in Figs. 9 and 10. As the gear 94 is turned in the direction of the arrow 112 of Fig. 10, the adjusting screw 97 forces the arm 100 to move with an angular velocity exactly equal to the angular velocity of the gear 94. As the arm 100 moves from its full line position in Fig. 10 into the dotted line position 113, the stud 105 bridges the pair of main contacts 108, and the stud 106 bridges the auxiliary contacts 109. It will be noted that the pair of auxiliary contacts 109 are slightly longer than the pair of contacts 108, so that the stud 105 will make and break contact with the contacts 108 before the stud 106 makes or breaks contact with the auxiliary contacts 109. Inasmuch as the arm 100 is pivoted to the shaft 95, it will tend to fall into its dotted line position indicated at 114 of Fig. 10 as soon as it passes its vertical position. However, the friction between the studs and their respective contacts is great enough to prevent the arm 100 from falling until the instant at which the stud 106 breaks contact with the pair of auxiliary contacts 109, at which instant the arm quickly falls into its dotted line position 114. This quick fall is especially advantageous, inasmuch as when the stud 106 breaks contact with the auxiliary contacts 109 the driving circuit of the motor is broken, and if the stud 106 were slowly drawn away from the pair of contacts 109, severe arcing would occur, which would be detrimental to the contacts 109 and the stud 106.

In order to prevent the arm 100 from falling forward into contact with the pairs of main and auxiliary contacts 108 and 109 when this arm is just passing its vertical position, we provide a pair of retarding members 116. One of these retarding members is secured to the inner face of each side wall of the casing 91 directly below the insulated member 110. These retarding members are preferably formed of spring material and are adapted to engage the arm 100 when this arm reaches its vertical position. This engagement continues until after the studs 105 and 106 have come into contact with their respective pairs of contacts.

The way in which the apparatus of our invention is electrically connected is best shown in the wiring diagram which appears in Fig. 11. In this wiring diagram, the numbers of the parts already described agree with the numerals found in Figs. 1 to 10 inclusive. In Fig. 11 we have shown our invention as being connected to two circuit breakers, but it should be understood that any number may be added by connecting them in a manner similar to that indicated in Fig. 11. Referring to this figure, each circuit breaker 10 has a pallet switch 120 connected therewith, so that when the circuit breaker is tripped, a pair of discs of the pallet switch 120 respectively bridges a pair of main contacts 121 and a pair of auxiliary contacts 122. One of the main contacts 122 of each pallet switch 120 is directly connected to one leg 125 of a line switch 126, this line switch being connected to a suitable source of power by a circuit 127. The other main contact 121 is connected to an arm 129 of a lockout relay 130 associated with this particular circuit breaker, there being one lockout relay for each circuit breaker 10. The arm 129 of each lockout relay 130 is adapted to resume one of two positions, one of these positions being shown in full lines in the wiring diagram. This position is termed the "operating position", and when the arm 129 is so disposed, this arm shunts across primary and secondary contacts 131 and 132. When in a non-operating position, the arm 129 swings upward to engage a tertiary contact 133. The primary contacts 131 of each of the lockout relays 130 are connected together, while the secondary contacts 132 of each lockout relay is connected to one of a pair of stationary contacts of the selector switch 70, the other of this pair of stationary contacts being connected to the solenoid winding 50 of the clutch mechanism 15 associated with the particular circuit breaker identified by this pair of stationary contacts. The arm 129 is electrically connected to a solenoid 135 of its respective lockout relay, this solenoid being adapted to move the arm 129 from its full line position into its dotted line position, but not vice versa. Thus, when the solenoid 135 is energized the arm 129 of the lockout switch is thrown upward, making contact with the tertiary contact 133, thus energizing an alarm circuit in a manner to be hereinafter described.

The motor 23 has terminals 137 and 138, these terminals being supplied with electrical energy from the circuit 127 by the operation of a motor control switch 140. This motor control switch comprises a pivoted armature 141, this armature carrying a blade 142 which is adapted to engage a pair of contacts 143 of the motor control switch when a latching solenoid 145 is energized. When an unlatching solenoid 146, disposed on the opposite side of the pivot point of the arm 141, is energized, the arm 141 is adapted to disengage the blade 142 from the contacts 143, this position being shown in Fig. 11. One of these contacts 143 is connected to one terminal of the latching solenoid 145 and also to a leg 150 of the line switch 126. The other terminal of the latching solenoid 145 is connected to the primary contact 131 of each of the lockout relays 130. One of the main contacts 108 of the limit switch 90 is also connected to the leg 150 of the line switch 128, as is also the remaining terminal of each solenoid winding 50. The remaining free contact of the pair of contacts 143 is directly connected to the terminal 137 of the motor 23 and also to one of the pair of auxiliary contacts 109 of the limit switch 90, the remaining auxiliary contact of this pair being connected to the leg 150 of the switch through one of the pair of main contacts 108 previously mentioned. The terminal 138 of the motor is connected to one terminal of the unlatching solenoid 146 and also to the leg 125 of the line switch 126. The remaining terminal of the unlatching solenoid 146 is connected to the remaining terminals of each lockout relay and also the remaining contact of the main pair of contacts 108.

Each of the tertiary contacts 133 of the lockout relays 130 is connected together and to an alarm circuit 160. One wire of the alarm circuit is connected to the leg 150 of the switch 126 and the other wire is connected to an operation recorder indicated by the numeral 162. This operation recorder has a series of terminals thereon, each of these terminals being connected to the free auxiliary contact 122 of the pallet switch 120 so that when the pallet switch is closed, this closing will be indicated on a suitable recording mechanism in the operation recorder 162. The operation recorder 162 is adapted to give a graph of each of the circuit breakers 10, this graph being recorded on a suitable chart so that a record of the operation of each breaker is obtained.

The alarm circuit is connected to a suitable bell or other indicating device, not shown, so that whenever one of the arms of a lockout relay 130 engages a tertiary contact 133, this alarm is sounded and the operator can determine that a manual reclosing of the lockout relay 130 will be necessary before the breaker associated with this relay can be again automatically closed by the reclosing mechanism.

The operation of our apparatus is as follows:

In the event that a short-circuit, or other predetermined adverse condition, occurs on the line of any circuit breaker, this breaker immediately opens its contacts, and the pallet switch associated therewith closes its main and auxiliary contacts 121 and 122. This completes a circuit from the leg 125 of the switch 126 through the main contacts 120 of the pallet switch, through the arm 129 of the lockout relay associated with this circuit breaker and through the primary contact 131 of that relay to the latching solenoid 145, whence the current returns to the leg 150 of the switch 126. This energizes the latching solenoid 145 and causes the blade 142 of the motor control switch to bridge the contacts 143. When this occurs, current may flow from the leg 125 to the terminal 138 of the motor 23, the circuit being completed through the terminal 137, the contacts 143 of the motor control switch, and back to the leg 150 of the line switch 126. This sets the motor 23 into operation. As the motor operates, the auxiliary shaft 72 is rotated at a slow rate of speed due to the worm gearing connected between the shafts 22 and 72. When the selector contact 79 bridges across the pair of contacts of the selector switch associated with the solenoid 48 and this particular breaker, current flows from the leg 125 of the line switch through the main contacts 121 of the pallet switch and through the secondary contact 132 of the lockout relay. It then passes through the selector contact 79 and to the particular solenoid winding 50 associated with the breaker which has tripped out, the current returning from this solenoid winding to the leg 150 of the line switch 126. This energizes this particular solenoid 50 and causes the hardened pin 55 to engage the outer periphery of the rim 42 of the primary clutch member 40.

Referring now to Fig. 1, this view shows the position of the switch apparatus at this instant. The crank disc 30 is rotating in the direction of the arrow 170, so that the rocking lever 33 is at this instant being drawn in a counter-clockwise direction. As the lever 33 turns, the elongated aperture 43 is moved closer to the point of contact between the pin 55 and the annular rim 42. When the crank disc 30 has reached the position indicated in Fig. 2, the elongated aperture 43 and the opening 57 are in alignment so that the core 52 is forced upward, due to the electrical energy being supplied to the solenoid. The pin thus moves upward into the elongated aperture 43, and the spring 58 is compressed. This position of the apparatus is clearly shown in Fig. 2. As the crank disc 30 rotates through another 180°, the rocking lever 33 is turned in a clockwise direction through a definite angle. Inasmuch as the clutch is engaged, the reclosing arm 60 is turned through an equal angle, thus drawing the handle 63 of the circuit breaker into a position shown in Fig. 3. On the next 180° of rotation, the rocking lever 33 is again drawn counter-clockwise and, the solenoid 48 being still energized, the reclosing arm is moved in a counter-clockwise direction and the handle 63 is forced upward to close the breaker. The current through the solenoid 48 is stopped at the instant that the selector contact 79 leaves the pair of contacts associated with this particular solenoid. This condition occurs when the handle 63 is approximately half-way in. The pin 55 will not be drawn from the elongated aperture 43 at this instant, due to the high frictional force thereon due to the reclosing arm being driven by the rocking lever 33. When the handle 63 is again in its uppermost position, this frictional force will be relieved as the pin moves toward the center of the elongated aperture 43 at which time the spring 58 will quickly withdraw the pin 55 outward to disengage the clutch mechanism. Should the adverse condition still remain on the line, the breaker will be immediately opened and the series of reclosing operations will continue until the predetermined time limit of operation of the actuating means 12 has been reached, at which time the motor shuts down due to the action of the limit switch 90.

When the motor first starts, the arm 100 of the limit switch is in a downward position and does not move until the adjusting screw 97 comes into contact therewith. As the motor continues to operate, the arm 100 is rotated in a direction indicated by the arrow 112 until the stud 106 bridges the auxiliary contacts 109. At this particular instant current flows from the leg 125 of the switch 126 through the motor 23, and through the stud 106, from whence it returns to the leg 150 of the switch 126. This energizes the motor 23 and keeps the actuating mechanism in operation. An instant later the stud 105 bridges the main contacts 108 and a circuit is completed which allows current to flow from the leg 125 through the unlatching solenoid 146 and the stud 105 whence it returns to the leg 150 of the switch 126. This energizes the unlatching solenoid 146 and causes the armature 141 to assume its position shown in Fig. 11, thus breaking the bridge between the contacts 143, and breaking the circuit to the motor 23 through these contacts 143. However, due to the fact that the stud 106 is still bridging the auxiliary contacts 109 of the limit switch, the motor 23 does not stop but receives current from the leg 125 through the terminals 138 and 137, this circuit being completed back to the switch 126 through the stud 106. Thus, the motor 23 continues to operate until the stud 106 breaks contact with the auxiliary contacts 109, at which time the arm 100 drops into its lowermost position and the motor shuts down.

It should be noted that this method of shutting down the motor 23 is effective irrespective of whether the circuit breaker 10 is in a closed or open position. If the breaker is in a closed position, nothing further occurs until this or another breaker drops out, at which time the motor again starts and the operations described above are repeated. If, however, the studs 105 and 106 respectively bridge their contacts when the circuit breaker 10 is still open, a circuit will be completed from the leg 125 through the main contacts 121 of the pallet switch 120 and through the solenoid 135 of the lockout relay 130 associated with the particular breaker which has remained open, this circuit being completed through the stud 105 bridging the main contacts 108 of the limit switch, and thence to the leg 150 of the line switch. This circuit is, of course, broken when the arm 100 of the limit switch 90 falls. The energization of the solenoid 135 forces the arm 129 into its dotted line position. When in this position, a circuit is completed from the leg 125 of the line switch through the main contacts 121 of the pallet switch 120 and through the arm 129 of the lockout relay and the tertiary contact 133 thereof, this circuit being completed through the alarm circuit 160, and the leg 150 of the line switch 126. This will energize the alarm circuit and indicate to the operator that the circuit breaker did not remain closed and that the trouble should be investigated. It is necessary to manually reset the arm 129 of the lockout relay before this particular circuit breaker can again be automatically operated by the reclosing mechanism.

Each trip-out of a circuit breaker 10 is recorded by the operation of the recorder 162, this circuit being completed from the leg 125 of the line switch through the auxiliary contacts 122 of the pallet switch and to the operation recorder 162, from whence it returns to the leg 150 of the line switch 126.

It should be clear that our device is applicable not only to the particular type of circuit breaker shown, but also to practically every form of circuit breaker at present on the market. Furthermore, any number of switches may be attached to the mechanism without fear of the mechanism becoming overloaded even though all the circuit breakers might trip at once, inasmuch as these breakers are successively and selectively reclosed in predetermined sequence and at predetermined time intervals. It should thus be clear that a much smaller capacity motor may be used than if all the breakers were simultaneously actuated, the size of motor required being only one large enough to operate a single breaker.

We claim as our invention:

1. In a circuit-breaker reclosing system, the combination of: a circuit breaker, said breaker opening the circuit therethrough upon the occurrence of a predetermined condition of said circuit; drive means; means actuated by the tripping of said breaker for setting said drive means into operation for a predetermined period of time, said period of time being sufficiently long to permit repeated reclosings of said circuit breaker; and a clutch mechanism operatively connecting said circuit breaker and said actuating means for reclosing said circuit breaker.

2. In a circuit-breaker reclosing system, the combination of: a circuit breaker; a handle on said circuit breaker, said handle being manually engageable to close said circuit breaker; an actuating means operable by the tripping of said circuit breaker; and oscillating means connecting said actuating means and said handle for closing said circuit breaker.

3. In a circuit-breaker reclosing system, the combination of: a plurality of circuits; a circuit breaker in each of said circuits, each of said breakers being adapted to be tripped to open its respective circuit upon the occurrence of a predetermined adverse condition on its respective circuit; actuating means set into motion by the tripping of any one of said circuit breakers, said actuating means then operating for a predetermined period of time; means mechanically connecting said actuating means and said circuit breakers for successively closing such of said breakers as have been tripped; and means for rendering inoperative the mechanical connection between said actuating means and a particular breaker should said adverse condition of its associated circuit not be removed after repeated closings of said breaker.

4. In a circuit-breaker reclosing system, the combination of: a plurality of circuits; a circuit breaker in each of said circuits, each of said breakers being adapted to be tripped to open its respective circuit upon the occurrence of a predetermined adverse condition on its respective circuit; actuating means set into motion by the tripping of any one of said circuit breakers, said actuating means then operating for a predetermined period of time; and an electromagnetically controlled means for mechanically connecting said actuating means and said circuit breakers for successively closing such of said breakers as have been tripped out.

5. In a circuit-breaker reclosing system, the combination of: a circuit breaker; an actuating means; an electromagnetic clutch operatively connected to said actuating means and to said circuit breaker; and means operated by the tripping of said breaker for energizing said electromagnetic clutch to interconnect said actuating means and said circuit breaker immediately upon the tripping of said breaker, to close said breaker.

6. In a circuit-breaker reclosing system, the combination of: a circuit breaker; an arm on said circuit breaker; an actuating means; a shaft adapted to be oscillated by said actuating means; an electromagnetic clutch adapted to control a transfer of motion from said shaft to said arm of said circuit breaker; and means for energizing said electromagnetic clutch to interconnect said actuating means and said circuit breaker when said breaker is tripped, to close said breaker.

7. In a circuit-breaker reclosing system, the combination of: a circuit breaker; an arm on said circuit breaker; an actuating means; a shaft adapted to be oscillated by said actuating means; a primary clutch member on said shaft; a secondary clutch member connected to said arm of said circuit breaker; an electromagnetic clutch adapted to connect said primary and said secondary clutch members together; and means for energizing said clutch to reclose said circuit breaker when said breaker has tripped out.

8. In a circuit-breaker reclosing system, the combination of: a circuit breaker; an arm on said circuit breaker; an actuating means, a shaft adapted to be oscillated by said actuating means; a primary clutch member on said shaft; a secondary clutch member connected to said arm of said circuit breaker; clutch means for connecting said primary and said secondary clutch members together; and means for engaging said clutch means with said clutch members to reclose said circuit breaker when said breaker has tripped out.

9. In a circuit-breaker reclosing system, the combination of: a plurality of circuit breakers; a motor; means for energizing said motor when any one of said circuit breakers is tripped due to an adverse condition on its respective circuit; a shaft adapted to be oscillated by said motor; a primary clutch member on said shaft adjacent said circuit breaker; a secondary clutch member adjacent each primary clutch member, each of said secondary clutch members being connected to one of said circuit breakers to reclose same; solenoid-operated pins adapted to secure adjacent primary and secondary clutch members together; a selector switch adapted to successively energize the solenoids of said pins associated with any breakers which have tripped out, to close said breakers; and a time-limit switch adapted to operate said motor for a predetermined period of time.

10. In a circuit-breaker reclosing system, the combination of: a plurality of circuit breakers; a motor; means for energizing said motor when any one of said circuit breakers is tripped due to an adverse condition on its respective circuit; a shaft adapted to be oscillated by said motor; a primary clutch member on said shaft adjacent each circuit breaker; a secondary clutch member adjacent each primary clutch member, each of said secondary clutch members being connected to one of said circuit breakers to reclose same; solenoid-operated pins adapted to secure adjacent primary and secondary clutch members together; a selector switch adapted to successively energize the solenoids of said pins associated with any breakers which have tripped out, to close said breakers; a time-limit switch adapted to operate said motor for a predetermined period of time; and means for automatically removing from further influence of said reclosing mechanism any circuit breaker which remains open when said time-limit switch acts to stop said motor.

11. In a circuit-breaker reclosing system, the combination of: a plurality of circuits; a circuit breaker in each of said circuits, each of said breakers being adapted to be tripped to open its respective circuit upon the occurrence of a predetermined adverse condition on its respective circuit; actuating means set into motion by the tripping of any one of said circuit breakers, said actuating means then operating for a predetermined period of time; an electromagnetic clutch for each circuit breaker and adapted when energized to operatively connect the breaker associated therewith and said actuating means; and means for successively energizing said electromagnetic clutches.

12. In a circuit-breaker reclosing system, the combination of: a plurality of circuits; a circuit breaker in each of said circuits, each of said breakers being adapted to be tripped to open its respective circuit upon the occurrence of a predetermined adverse condition on its respective circuit; actuating means set into motion by the tripping of any one of said circuit breakers; a plurality of primary clutch members operatively connected to said actuating means; a secondary clutch member operatively connected to each circuit breaker, each of said secondary clutch members lying adjacent one of said primary clutch members; and means for operatively connecting adjacent clutch members when the breaker associated therewith is tripped.

13. In a circuit-breaker reclosing system, the combination of: a plurality of circuit breakers each of which is adapted to be tripped when the circuit associated therewith experiences an adverse condition; an oscillating shaft; a plurality of arms operatively connected to said circuit breakers; and a magnetic clutch associated with each arm for operatively connecting said arm to said oscillating shaft upon the tripping of said circuit breaker associated therewith.

14. In a circuit-breaker reclosing system, the combination of: a circuit breaker; a reclosing link adapted to close said breaker; an oscillating shaft; a primary clutch member operatively connected to said shaft and having an aperture therein; a secondary clutch member adjacent said primary clutch member; a pin carried by said secondary clutch member and adapted to fit into said aperture when said clutch members are correctly aligned; a solenoid adapted when energized to move said pin into engagement with said primary clutch member until said members are correctly aligned, at which time said pin engages in said aperture to mechanically connect said clutch members; an arm on said secondary clutch member and connected to said reclosing link; and means for energizing said solenoid when said circuit breaker trips.

15. In a circuit-breaker reclosing system, the combination of: a circuit breaker; a reclosing link adapted to close said breaker; an oscillating shaft; a primary clutch member operatively connected to said shaft and having an aperture therein; a secondary clutch member adjacent said primary clutch member and operatively connected to said reclosing link; a pin carried by said secondary clutch member and adapted to fit into said aperture when said clutch members are correctly aligned; means for exerting a resilient force on said pin in a manner to effect a resilient engagement between said pin and said primary clutch member when said circuit breaker is tripped, said secondary clutch member moving until said pin engages in said aperture, at which time said oscillating shaft and said arm are mechanically connected together to reclose said breaker, the force on said pin being released prior to the instant of completion of the reclosing movement; and resilient means acting to withdraw said pin from said aperture, said resilient means being ineffective in removing said pin therefrom until the completion of said reclosing movement.

16. In a circuit-breaker reclosing system, the combination of: a circuit breaker; an arm on said circuit breaker; an operating plunger movable to operate said circuit breaker, said arm, when in a withdrawn position, engaging with said plunger; a reclosing link secured to said arm; drive means associated with said reclosing link; and means for setting said drive means into operation when said circuit breaker is opened for moving said arm from closed position into withdrawn position and again into closed position to move said operating plunger.

17. In a circuit-breaker reclosing system, the combination of: a circuit breaker; a motor energized when said breaker trips; a shaft driven by said motor; a time-limit switch operated by said shaft for de-energizing said motor after a predetermined time; crank means associated with said shaft; a linkage connecting said crank means and said circuit breaker; magnetic means associated with said linkage for controlling the transfer of motion from said shaft to said circuit breaker through said linkage; and a selector switch operatively connected to said shaft and connected to said magnetic means.

18. In a circuit-breaker reclosing system, the combination of: a circuit breaker; a motor, clutch means operatively connecting said motor and said circuit breaker; means for energizing said motor when said circuit breaker is tripped; a selector switch driven by said motor for controlling said clutch means; and a time-limit switch driven by said motor and controlling the supply of energy thereto.

19. In a circuit-breaker reclosing system, the combination of: a circuit breaker, said circuit breaker tripping to open the circuit therethrough upon the occurrence of a predetermined condition on said circuit; a drive means; means mechanically connecting said drive means and said circuit breaker for closing said circuit breaker; and means actuated by the tripping of said circuit breaker for setting said drive means into operation for a predetermined period of time greater than the time necessary for a single closing of said circuit breaker.

20. In a circuit-breaker reclosing system, the combination of: a plurality of circuits; a circuit breaker in each of said circuits, each breaker being adapted to be tripped to open its respective circuit upon the occurrence of a predetermined adverse condition on its respective circuit; a drive means; means for operating said drive means for a predetermined period of time upon the tripping of any one of said circuit breakers, said period of time being greater than the time necessary for said one of said breakers to be reclosed; and means mechanically connecting said drive means and said circuit breakers for successively closing such of said circuit breakers as have been tripped.

In testimony whereof, the said CHARLES E. SCHNELL has hereunto set his hand at Fresno, California, the 9th day of January, 1928, and the said ERNEST K. SADLER has hereunto set his hand at Los Angeles, California, the 7th day of January, 1928.

CHARLES E. SCHNELL.
ERNEST K. SADLER.

CERTIFICATE OF CORRECTION.

Patent No. 1,835,343.  Granted December 8, 1931, to

CHARLES E. SCHNELL ET AL.

It is hereby certified that error appears in the printed specification of the above numbered patent requiring correction as follows: Page 7, line 71, claim 9, for the words "said circuit" read each circuit; and that the said Letters Patent should be read with this correction therein that the same may conform to the record of the case in the Patent Office.

Signed and sealed this 16th day of February, A. D. 1932.

(Seal)

M. J. Moore,
Acting Commissioner of Patents.